(12) United States Patent
Krishna (10) Patent No.: US 9,838,359 B2
(45) Date of Patent: Dec. 5, 2017

(54) SEPARATION OF IOT NETWORK THING IDENTIFICATION DATA AT A NETWORK EDGE DEVICE

(71) Applicant: CA, INC., New York, NY (US)

(72) Inventor: Vikas Krishna, San Jose, CA (US)

(73) Assignee: CA, INC., New York, NY (US)

( * ) Notice: Subject to any disclaimer, the term of this patent is extended or adjusted under 35 U.S.C. 154(b) by 104 days.

(21) Appl. No.: 14/926,956

(22) Filed: Oct. 29, 2015

(65) Prior Publication Data

US 2017/0126628 A1    May 4, 2017

(51) Int. Cl.
  *H04L 29/06*    (2006.01)

(52) U.S. Cl.
  CPC ...... *H04L 63/0421* (2013.01); *H04L 63/0428* (2013.01)

(58) Field of Classification Search
  CPC ................. H04L 63/0421; H04L 63/0428
  USPC ....................................................... 713/150
  See application file for complete search history.

(56) References Cited

U.S. PATENT DOCUMENTS

| | | | |
|---|---|---|---|
| 9,288,184 B1 * | 3/2016 | Kvamme | H04L 63/0227 |
| 2003/0050955 A1 * | 3/2003 | Eatough | H04L 12/1859 |
| | | | 709/201 |
| 2007/0156859 A1 * | 7/2007 | Savchenko | H04L 67/02 |
| | | | 709/220 |
| 2014/0129628 A1 * | 5/2014 | Fletcher | H04W 12/02 |
| | | | 709/204 |

* cited by examiner

*Primary Examiner* — Kambiz Zand
*Assistant Examiner* — Benjamin Kaplan
(74) *Attorney, Agent, or Firm* — Sage Patent Group (57) ABSTRACT

A method includes performing operations as follows on a processor of an edge device of a network: receiving a data record from a thing, the record comprising a plurality of fields, replacing information in one of the plurality of fields that provides an identity of the thing with mask information that masks the identity the thing. communicating the data record with the mask information toward an information processor external to the network in a first message, communicating the information in the one of the plurality of fields that identifies the thing toward the information processor external to the network in a second message that is communicated separately from the first message, and communicating mapping information that associates the first message with the second message toward the information processor.

20 Claims, 6 Drawing Sheets

| Version | |
|---|---|
| Source | Dest |
| Data ||
| Error Correction ||

*FIG. 5A*

| Version | Label 1 |
|---|---|
| Fake | Dest |
| Data ||
| Error Correction ||

*FIG. 5B*

| Version | Label 2 |
|---|---|
| Source | Dest |
| Data (empty) ||
| Error Correction ||

*FIG. 5C*

| Fake | ID |
|------|-----|
| X1C | Z6A |
| H2I | E3B |
| J7Q | F9V |

*FIG. 6*

SEPARATION OF IOT NETWORK THING IDENTIFICATION DATA AT A NETWORK EDGE DEVICE

BACKGROUND

The present disclosure relates to the Internet of Things (IoT), and, in particular, to methods, systems, and computer program products for communicating information generated by things in the IoT in a secure fashion.

The Internet of Things (IoT) refers to a network of physical and virtual things having embedded computer systems associated therewith that allow the things to exchange data with other entities, such as a user, operator, manufacturer, technician, analyst, etc. based on the International Telecommunication Union's Global Standards Initiative. The IoT may allow, for example, things to be sensed, monitored, and/or controlled remotely across existing network infrastructure, which may create more opportunities for direct integration between the physical world and computer-based systems, and may result in improved efficiency, accuracy, and economic benefit. Each thing may be uniquely identifiable through its associated embedded computing system and is able to interoperate within the existing Internet infrastructure. Some experts estimate that the IoT will consist of almost 50 billion things by 2020. The things in the IoT can refer to a wide variety of device or object types such as, but not limited to, industrial electronic devices, environmental sensors, security devices, power plant control/monitoring systems, airplane engine and flight control monitoring systems, railway control and monitoring systems, manufacturing control systems, and the like. The data collected from such things may in some instances be highly confidential. Rather than transmit the data from these things to a third party entity for analysis across the Internet, such as a manufacturer or third party data analyst, an enterprise may make manual copies of the electronic drives containing the data and provide them to the destination party.

SUMMARY

In some embodiments of the inventive subject matter, a method comprises performing operations as follows on a processor of an edge device of a network: receiving a data record from a thing, the record comprising a plurality of fields, replacing information in one of the plurality of fields that provides an identity of the thing with mask information that masks the identity the thing. communicating the data record with the mask information toward an information processor external to the network in a first message, communicating the information in the one of the plurality of fields that identifies the thing toward the information processor external to the network in a second message that is communicated separately from the first message, and communicating mapping information that associates the first message with the second message toward the information processor.

In other embodiments of the inventive subject matter, a system comprises a processor of an edge device of a network and a memory coupled to the processor, which comprises computer readable program code embodied in the memory that when executed by the processor causes the processor to perform operations comprising: receiving a data record from a thing, the record comprising a plurality of fields, replacing information in one of the plurality of fields that provides an identity of the thing with mask information that masks the identity the thing, communicating the data record with the mask information toward an information processor external to the network in a first message, communicating the information in the one of the plurality of fields that identifies the thing toward the information processor external to the network in a second message that is communicated separately from the first message, and communicating mapping information that associates the first message with the second message toward the information processor.

In further embodiments of the inventive subject matter, a computer program product comprises a tangible computer readable storage medium comprising computer readable program code embodied in the medium that when executed by a processor of an edge device of a network causes the processor to perform operations comprising: receiving a data record from a thing, the record comprising a plurality of fields, replacing information in one of the plurality of fields that provides an identity of the thing with mask information that masks the identity the thing. communicating the data record with the mask information toward an information processor external to the network in a first message, communicating the information in the one of the plurality of fields that identifies the thing toward the information processor external to the network in a second message that is communicated separately from the first message, and communicating mapping information that associates the first message with the second message toward the information processor.

It is noted that aspects described with respect to one embodiment may be incorporated in different embodiments although not specifically described relative thereto. That is, all embodiments and/or features of any embodiments can be combined in any way and/or combination. Moreover, other methods, systems, articles of manufacture, and/or computer program products according to embodiments of the inventive subject matter will be or become apparent to one with skill in the art upon review of the following drawings and detailed description. It is intended that all such additional systems, methods, articles of manufacture, and/or computer program products be included within this description, be within the scope of the present inventive subject matter, and be protected by the accompanying claims. It is further intended that all embodiments disclosed herein can be implemented separately or combined in any way and/or combination.

BRIEF DESCRIPTION OF THE DRAWINGS

Other features of embodiments will be more readily understood from the following detailed description of specific embodiments thereof when read in conjunction with the accompanying drawings, in which.

DETAILED DESCRIPTION

In the following detailed description, numerous specific details are set forth to provide a thorough understanding of embodiments of the present disclosure. However, it will be understood by those skilled in the art that the present invention may be practiced without these specific details. In some instances, well-known methods, procedures, components and circuits have not been described in detail so as not to obscure the present disclosure. It is intended that all embodiments disclosed herein can be implemented separately or combined in any way and/or combination. Aspects described with respect to one embodiment may be incorporated in different embodiments although not specifically described relative thereto. That is, all embodiments and/or features of any embodiments can be combined in any way and/or combination.

As used herein, a "service" includes, but is not limited to, a software and/or hardware service, such as cloud services in which software, platforms, and infrastructure are provided remotely through, for example, the Internet. A service may be provided using Software as a Service (SaaS), Platform as a Service (PaaS), and/or Infrastructure as a Service (IaaS) delivery models. In the SaaS model, customers generally access software residing in the cloud using a thin client, such as a browser, for example. In the PaaS model, the customer typically creates and deploys the software in the cloud sometimes using tools, libraries, and routines provided through the cloud service provider. The cloud service provider may provide the network, servers, storage, and other tools used to host the customer's application(s). In the IaaS model, the cloud service provider provides physical and/or virtual machines along with hypervisor(s). The customer installs operating system images along with application software on the physical and/or virtual infrastructure provided by the cloud service provider.

As used herein, the term "data processing facility" includes, but it not limited to, a hardware element, firmware component, and/or software component. A data processing system may be configured with one or more data processing facilities.

As used herein, data are raw, unorganized facts that need to be processed. Data can be something simple and seemingly random and useless until it is organized. When data are processed, organized, structured or presented in a given context so as to make it useful, it is called content or information. Examples of content or information include, but are not limited to, word processing files, slide presentation program files, spreadsheet files, video files, audio files, picture files, and document exchange files.

As used herein, the term "message" means a unit of information and/or a block of data that may be transmitted electronically as a whole or via segments from one device to another. Accordingly, as used herein, the term "message" may encompass such terms of art as "frame" and/or "packet," which may also be used to refer to a unit of transmission.

As used herein, an edge device is a type of network device that connects a first network (e.g., a Local Area Network (LAN)) with a second network (e.g., a Wide Area Network (WAN) or the Internet), where the first and second networks operate under the authority of different entities. Thus, an edge device provides interconnectivity and traffic translation between different networks on their entering edges or the network boundaries.

As used herein, a "thing," when referred to in context of the IoT, is an object of the physical world (physical thing) or an object of the information world (virtual thing), which is capable of being identified and integrated into a communication network. Things have associated information, which can be static and dynamic. A physical thing may be capable of sensing, may be capable of being actuated, and may be capable of being connected. Examples of physical things include, but are not limited to, an electronic sensor, a robot, a good, a product, and a piece of electrical equipment. A virtual thing may be capable of being stored, may be capable of being processed, and may be capable of being accessed. Examples of virtual things include, but are not limited to, multimedia content and application software stored in a memory and executed by a processor.

Some embodiments of the inventive subject matter stem from a realization that a network edge device that demarcates the division between a first network under local authority and a second network under third party or public authority (i.e., external to the first network) may be programmed to analyze the data collected from one or more networked things and to identify which data items in the collected data can be used to identify the source thing. For example, data provided by the thing in an IoT network may be organized in the form of records where each record includes a plurality of fields including information indicating, for example, an identification code of the thing, the reading (e.g., data generated or collected by the thing), the manufacturer of the thing, a time stamp, etc. In the above example, the edge device may strip from the record the identification code of the thing in the IoT network and the manufacturer of the thing in the IoT network from the record as these data items may be used by a hostile party to determine the source thing that generated the data. The edge device may replace these items with mask or fake information. The data without the identifying information may be transmitted over the Internet or one or more external networks to a third party (such as an information processor in the cloud) for analysis and processing in a first message. In addition, the data associated with the fields that were replaced with mask or fake information in the record may be transmitted separately over the Internet or one or more external networks to a third party for analysis and processing in a second message. The identifying information associated with the fields that were replaced may be further encrypted for additional security. A mapping may be sent to the third party that provides the ability for the third party to reassemble the data record with the information associated with the fields that were replaced. Even if the original data were to be intercepted by a hostile party, it would be difficult or impossible to identify the particular thing (e.g., plane, engine, power plant, government facility, etc.) in the IoT network that was the source of the data based on the information contained in the intercepted message.

Figure 1:
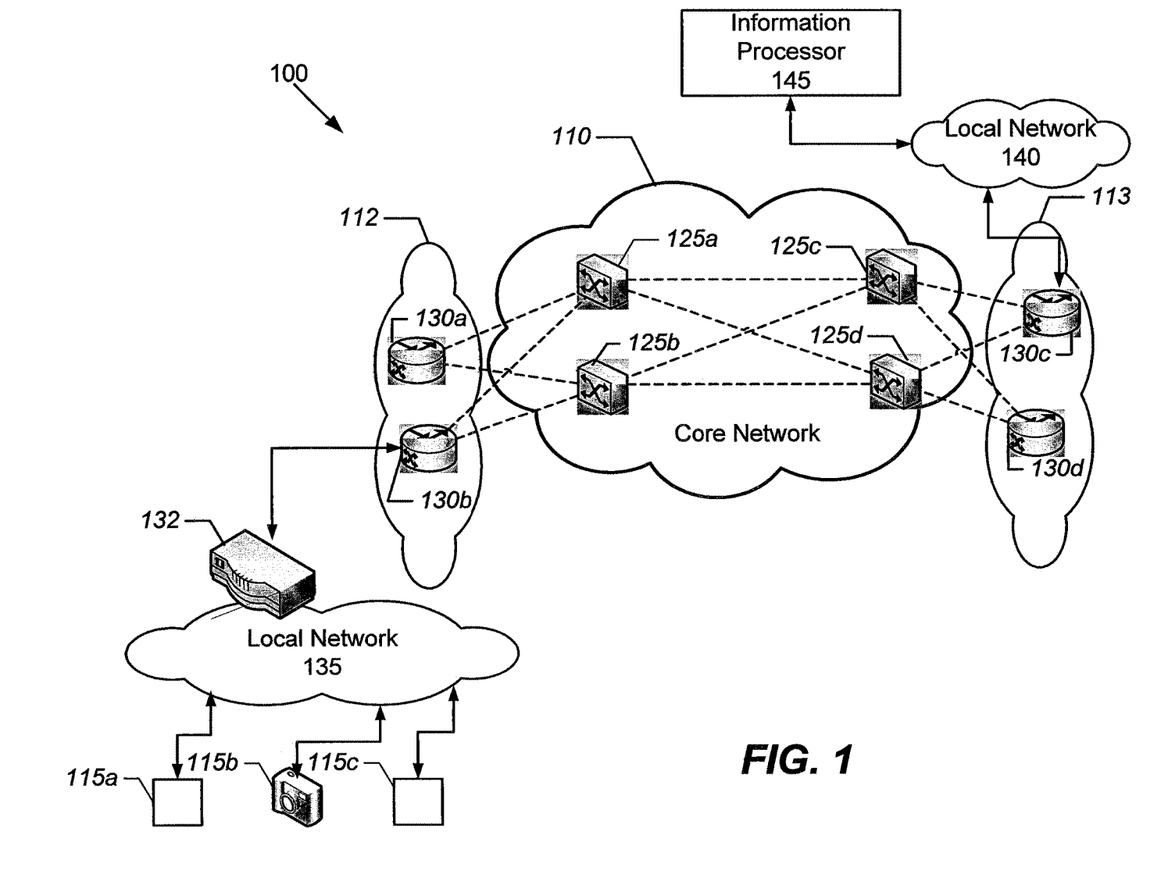
FIG. 1 is a block diagram of a communication network including an edge device for masking the identity of things in an Internet of Things (IoT) network in accordance with some embodiments of the inventive subject matter.

FIG. 1 is a block diagram of a communication network including an edge device for masking the identity of things in an IoT network in accordance with some embodiments of the inventive subject matter. The communication network 100 comprises a core network 110 coupled to a first access network 112 and a second access network 113. The core network 110 is the central part of the communications network 100 and provides various services to customers who are connected by the access networks 112 and 113. The core network 110 comprises switches/routers 125a, 125b, 125c, and 125d that are used to route calls and data traffic between the access networks 112 and 113. Access networks 112 and 113 comprise a part of the communications network 100 that is used to connect customers or subscribers to their immediate service provider. As shown in FIG. 1, access network 112 comprises switches/routers 130a, 130b along with the series of wires, cables, and equipment used to connect customers/subscribers associated with the local network 135. Similarly, access network 113 comprises switches/routers 130c, 130d along with the series of wires, cables, and equipment used to connect customers/subscribers associated with the local network 140. The core network 110, access network 112, and access network 113 may each operate under the authority of the same entity or different entities. For example, the access network 112 and the core network 110 may operate under the authority of a first service provider while the access network 113 may operate under the authority of a second service provider. The local networks 135 and 140 may operate under the authority of different entities than the core network 110, access network 112, and access network 113. For example, the local network 135 may be a private network or Virtual Private Network (VPN) implemented in a residence, small business, enterprise, etc. and may have things 115a, 115b, and 115c connected thereto as part of the IoT. The things 115a, 115b, and 115c may be connected to the local network 135 using wireless and/or wired connections. The local network 140 may be a private network or VPN implemented in an enterprise that uses the information processor 145 to process data generated by things, such as things 115a, 115b, and 115c, in the IoT. The information processor 145 may be connected to the local network 140 using a wireless and/or wired connection.

The core network 110, access network 112, and access network 113 may be a global network, such as the Internet or other publicly accessible network. Various elements of the core network 110, access network 112, and access network 113 may be interconnected by a wide area network, a local area network, an Intranet, and/or other private network, which may not be accessible by the general public. Thus, the core network 110, access network 112, and access network 113 may represent a combination of public and private networks or a VPN. The core network 110, access network 112, and access network 113 may be a wireless network, a wireline network, or may be a combination of both wireless and wireline networks.

The local network 135 may comprise an edge device 132 that may include a user interface through which a user may select one or more things 115a, 115b, and 115c that are connected to the local network 135 and configure the edge device 132 to mask the identity of the selected things 115a, 115b, 115c when the selected things generate data to be sent to and to be processed by the information processor 145, which may be operated by a manufacturer of the thing, a data analysis enterprise, a governmental agency, and the like. The things 115a, 115b, 115c in the IoT can refer to a wide variety of device or object types such as, but not limited to, industrial electronic devices, environmental sensors, security devices, power plant control/monitoring systems, airplane engine and flight control monitoring systems, railway control and monitoring systems, manufacturing control systems, police equipment and computers, military equipment and computers, governmental agency equipment and computers, and the like. The data collected from such things may in some instances be highly confidential.

In some embodiments, the things 115a, 115b, 115c may send data in the form of a record with multiple fields. Those fields, such as, but not limited to, Internet Protocol (IP) address, Media Access Control (MAC) address, manufacturer identification code, non-manufacturer identification code, name of the thing, and description of the thing that may identify the thing 115a, 115b, 115c can be removed from the data and replaced with mask or fake information, which may be recognizable, but incorrect information (such as valid data for a different or other type of thing), no information at all, or random data. The network edge device 132 may transmit via a first message the data with the original data from the fields that may identify the source thing 115a, 115b, 115c removed to the information processor 145, such as a manufacturer or third party data analyst, over an external network, such as access network 112, core network 110, access network 113, and local network 140, for processing. The network edge device 132 may also transmit separately via a second message the data corresponding to the fields that may be used to identify the source thing 115a, 115b, 115c to the information processor 145 over an external network, such as access network 112, core network 110, access network 113, and local network 140, for processing. The network edge device 132 may generate and send a mapping to the information processor 145 that that may allow the information processor 145 to associate the first and second messages so that the information processor 145 may reassemble the original data record with the data associated with the fields that were replaced with mask or fake information.

Although FIG. 1 illustrates a system for using an edge device to mask the identity of things in an IoT network in accordance with some embodiments of the inventive subject matter, it will be understood that embodiments of the present invention are not limited to such configurations, but are intended to encompass any configuration capable of carrying out the operations described herein.

Figure 2:
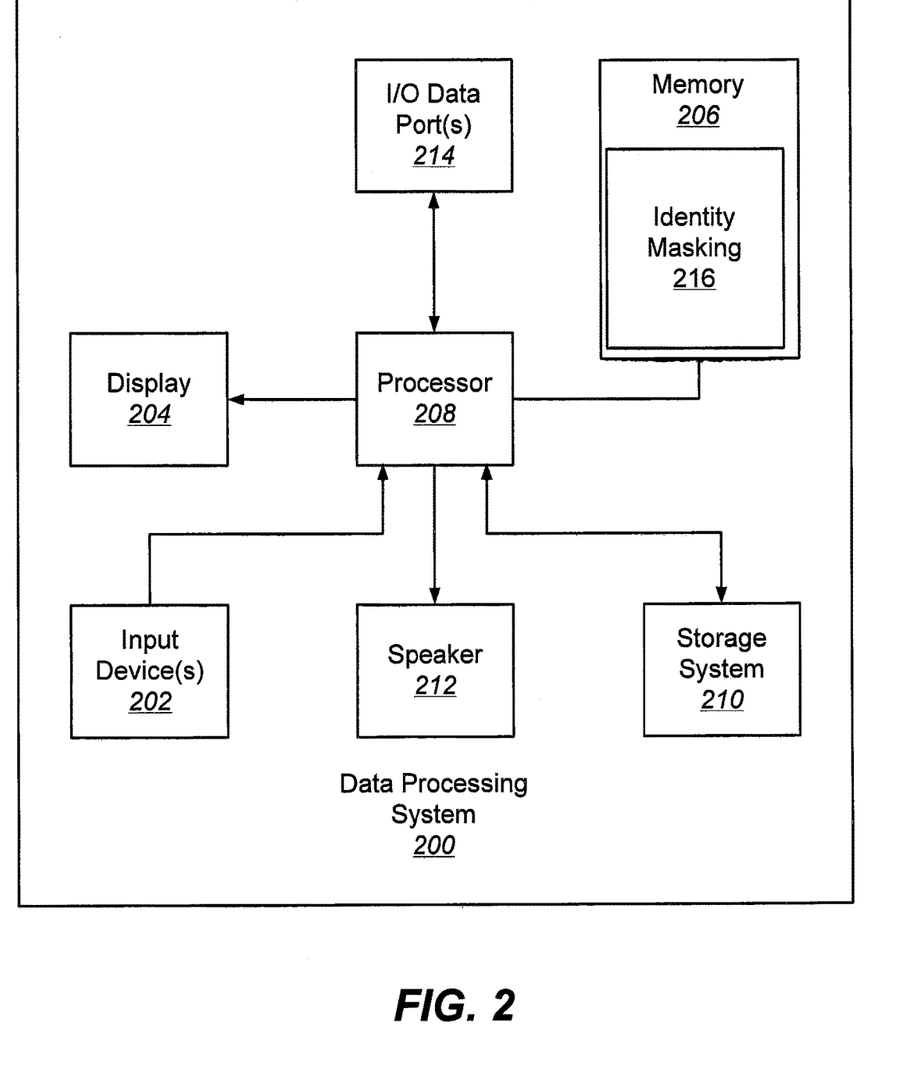
FIG. 2 illustrates a data processing system that may be used to implement the edge device of FIG. 1 in accordance with some embodiments of the inventive subject matter.

Referring now to FIG. 2, a data processing system 200 that may be used to implement the edge device 132 of FIG. 1, in accordance with some embodiments of the inventive subject matter, comprises input device(s) 202, such as a keyboard or keypad, a display 204, and a memory 206 that communicate with a processor 208. The data processing system 200 may further include a storage system 210, a speaker 212, and an input/output (I/O) data port(s) 214 that also communicate with the processor 208. The storage system 210 may include removable and/or fixed media, such as floppy disks, ZIP drives, hard disks, or the like, as well as virtual storage, such as a RAMDISK, The I/O data port(s) 214 may be used to transfer information between the data processing system 200 and another computer system or a network (e.g., the Internet). These components may be conventional components, such as those used in many conventional computing devices, and their functionality, with respect to conventional operations, is generally known to those skilled in the art. The memory 206 may be configured with an identity masking module 216 that may provide functionality that may include, but is not limited to, removing one or more fields of data received from one or more things that may be used to identify the things and replacing the removed fields of data with mask or fake information before sending the data over an external network to a cloud entity, such as the information processor 145 for processing. The data that was replaced with mask or fake information may be sent separately to the information processor 145 along with a mapping to allow the information processor 145 to reassemble the original data generated by the one or more things.

Figure 3:
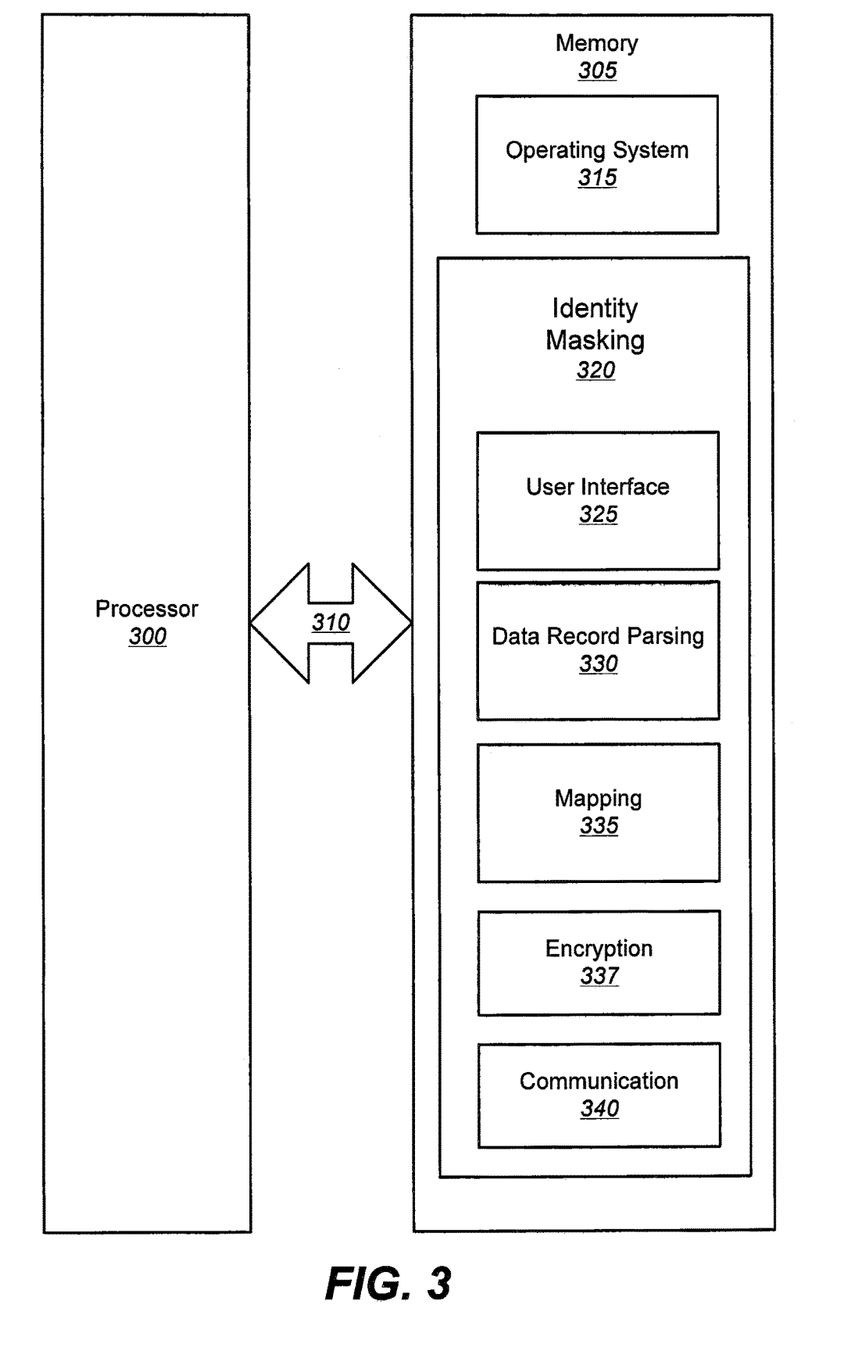
FIG. 3 is a block diagram that illustrates a software/hardware architecture for use in an edge device for masking the identity of things in an IoT network in accordance with some embodiments of the present inventive subject matter.

FIG. 3 illustrates a processor 300 and memory 305 that may be used in embodiments of data processing systems, such as the edge device 132 of FIG. 1 and the data processing system 200 of FIG. 2, respectively, for use in an edge device for masking the identity of things in an IoT network in accordance with some embodiments of the inventive subject matter. The processor 300 communicates with the memory 305 via an address/data bus 310. The processor 300 may be, for example, a commercially available or custom microprocessor. The memory 305 is representative of the one or more memory devices containing the software and data used for masking the identity of things in an IoT network in an edge device in accordance with some embodiments of the inventive subject matter. The memory 305 may include, but is not limited to, the following types of devices: cache, ROM, PROM, EPROM, EEPROM, flash, SRAM, and DRAM.

As shown in FIG. 3, the memory 305 may contain two or more categories of software and/or data: an operating system 315 and an identity masking module 320. In particular, the operating system 315 may manage the data processing system's software and/or hardware resources and may coordinate execution of programs by the processor 300.

The identity masking module 320 may comprise a user interface module 325, a data record parsing module 330, a mapping module 335, an encryption module 337, and a communication module 340. The user interface module 325 may be configured to provide an interface between the edge device 132 and a user's computing device, such as a laptop computer, desktop computer, tablet, smart phone and the like to allow the user to select one or more things 115a, 115b, and 115c that are connected to the local network 135 and configure the edge device 132 to mask the identity of the selected things 115a, 115b, 115c when the selected things generate data to be sent to and to be processed by the information processor 145. The data record parsing module 330 may be configured to parse data received from a thing 115a, 115b, 115c to identify fields therein that can be used to identify the thing as the source of the data. These fields may include, but are not limited to, an IP address, a MAC address, a manufacturer identification code, a non-manufacturer identification code, a name of the thing, and a description of the thing as described above. The data record parsing module 330 may replace the data contained in these source identifying fields with mask or fake information and may generate a second message containing the original data from these source identifying fields.

The mapping module 335 may be used to generate mapping information that associates the first message generated by the data record parsing module 330 containing the mask or fake information in the source thing identifying fields and the second message generated by the data record parsing module 330 that contains the original data from the source identifying fields. The mapping information may comprise a data structure, such as a table that associates a label used in the first message with a label used in the second message.

The encryption module 337 may be configured to encrypt the second message containing the original data from the source identifying fields that can be used to identify the thing 115a, 115b, 115c that generated the original data and/or the mapping information generated by the mapping module 337. The encryption module 337 may also provide one or more encryption keys to decrypt the original data and/or the mapping information. These encryption keys may be communicated in the first and/or second messages. In accordance with various embodiments of the inventive subject matter, the encryption module 337 may use public key encryption, symmetric key encryption, a substitution cipher, a transposition cipher, and a block cipher. The encryption technique used may vary based on the level of security desired, processing power at the edge device 132 and/or the information processor 145, a desired speed in encrypting and decrypting the information, and the like.

The communication module 340 may be configured to facilitate communication between the edge device 132 and other entities, such as the things 115a, 115b, and 115c and the information processor 145.

Although FIG. 3 illustrates hardware/software architectures that may be used in data processing systems, such as the edge device 132 of FIG. 1 and the data processing system 200 of FIG. 2, respectively, for masking the identity of things in an IoT network in accordance with some embodiments of the inventive subject matter, it will be understood that the present invention is not limited to such a configuration but is intended to encompass any configuration capable of carrying out operations described herein.

Computer program code for carrying out operations of data processing systems discussed above with respect to FIGS. 1-3 may be written in a high-level programming language, such as Python, Java, C, and/or C++, for development convenience. In addition, computer program code for carrying out operations of the present invention may also be written in other programming languages, such as, but not limited to, interpreted languages. Some modules or routines may be written in assembly language or even micro-code to enhance performance and/or memory usage. It will be further appreciated that the functionality of any or all of the program modules may also be implemented using discrete hardware components, one or more application specific integrated circuits (ASICs), or a programmed digital signal processor or microcontroller.

Moreover, the functionality of the edge device 132 of FIG. 1, the data processing system 200 of FIG. 2, and the hardware/software architecture of FIG. 3, may each be implemented as a single processor system, a multi-processor system, a multi-core processor system, or even a network of stand-alone computer systems, in accordance with various embodiments of the inventive subject matter. Each of these processor/computer systems may be referred to as a "processor" or "data processing system."

The data processing apparatus of FIGS. 1-3 may be used to mask the identity of things in an IoT network according to various embodiments described herein. These apparatus may be embodied as one or more enterprise, application, personal, pervasive and/or embedded computer systems and/or apparatus that are operable to receive, transmit, process and store data using any suitable combination of software, firmware and/or hardware and that may be stand-alone or interconnected by any public and/or private, real and/or virtual, wired and/or wireless network including all or a portion of the global communication network known as the Internet, and may include various types of tangible, non-transitory computer readable media. In particular, the memory 206 coupled to the processor 208 and the memory 305 coupled to the processor 300 include computer readable program code that, when executed by the respective processors, causes the respective processors to perform operations including one or more of the operations described herein with respect to FIG. 4.

Figure 4:
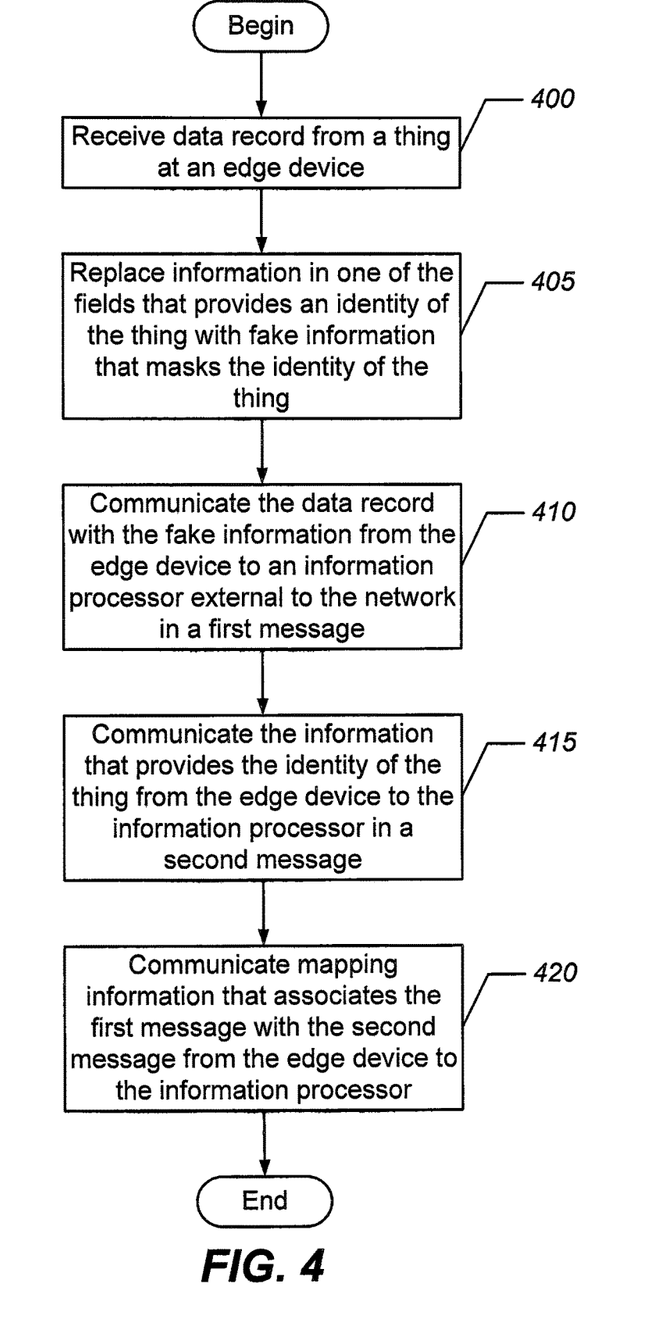
FIG. 4 is a flowchart that illustrates operations of an edge device for masking the identity of things in an IoT network in accordance with some embodiments of the inventive subject matter.
Figure 5A:
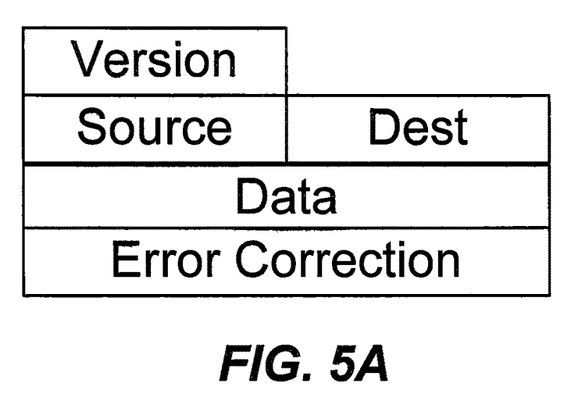
FIGS. 5A-5C are diagrams that illustrate message structures for masking the identity of things in an IoT network in accordance with some embodiments of the inventive subject matter.

FIG. 4 is a flowchart that illustrates operations of an edge device for masking the identity of things in an IoT network in accordance with some embodiments of the inventive subject matter. Referring now to FIG. 4, operations begin at block 400 where the edge device 132 receives a data record from a thing 115a, 115b, 115c. FIG. 5A shows an example data record generated by a thing and received at the edge device 132. The record includes fields identifying a version of whatever protocol is being used by the 115a, 115b, 115c to send data, a source field that identifies the thing 115a, 115b, 115c that generated the information, a destination field identifying an address, for example, of where the data is to be sent, a data field containing the data payload generated by the thing 115a, 115b, 115c, and an error correction field, such as a Cyclic Redundancy Check (CRC) field.

Figure 5B:
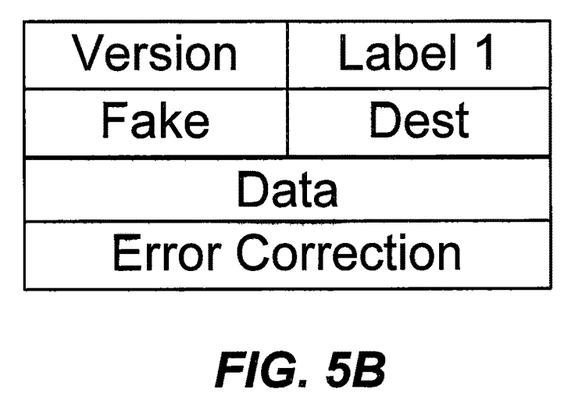

The data record parsing module 330 examines the data record shown in 5A and determines that the source field is the only field that can be used to identify the source thing 115a, 115b, 115c that generated the data. At block 405, the data record parsing module 330 replaces the information in the source field with mask or fake information that masks the identity of the thing 115a, 115b, 115c to generate a first message as shown in FIG. 5B. The first message shown in FIG. 5B has the data contained in the source field of FIG. 5A replaced with mask or fake information. In addition, the mapping module 335 may add a first label (Label 1) to the first message.

Figure 5C:
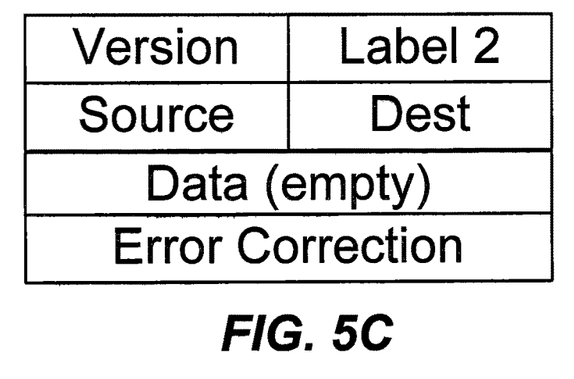

Operations continue at block 410 where the communication module 340 communicates the first message containing the data record with the mask or fake information (FIG. 5B) from the edge device 132 to the information processor 145. The data record parsing module 330 may also generate a second message as shown in FIG. 5C containing the original data from FIG. 5A from the source field identifying the thing 115a, 115b, 115c that is the source of the record. In addition, the mapping module 335 may add a second label (Label 2) to the second message. The communication module 340 communicates the second message containing the data record with the original data from FIG. 5A identifying the thing 115a, 115b, 115c that is the source of the record from the edge device 132 to the information processor 145 at block 415. As described above, the original data in the source field shown in FIG. 5C may be encrypted (or the entire second message may be encrypted) for additional security before communicating the second message to the information processor 145.

Figure 6:
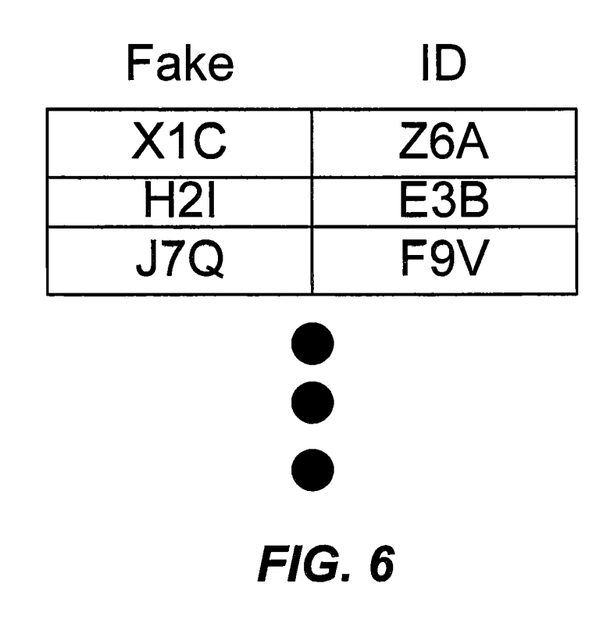
FIG. 6 is a diagram that illustrates a mapping between labels identifying messages containing fake identity information and messages containing actual identity information.

The mapping module 135 may generate mapping information that associates the first message with the second message and the communication module 340 communicates the mapping information from the edge device 132 to the information processor 145 at block 420. The mapping information may be a data structure, such as a table as shown in FIG. 6. The table of FIG. 6 shows codes that can be used as Label 1 in the left column under the Fake heading and the corresponding codes that can be sued as Label 2 in the right hand column under the ID heading. This mapping table may be sent once, for example, to the information processor 145 and periodically updated to reduce the risk that a hostile party may discover the codes used to link the message used to transmit the thing data with mask or fake source information and the message used to transmit the identity of the thing. For further security, the mapping information may be encrypted as described above before communication from the edge device 132 to the information processor 145.

Some embodiments of the inventive subject matter provide a network edge device that may include data record parsing module that can analyze the data received from various networked things and remove information from the data that can be used to identify the source of the data. For example, the data may be in the form of a record with multiple fields. Those fields, such as identification code, manufacturer name, IP address, etc. that may identify the thing in the IoT network can be removed from the data and replaced with mask or fake information. The network edge device may transmit the data with the identification information removed to a third party, such as a manufacturer or third party data analyst, over the Internet or other external network for processing. The network edge device may also transmit over the Internet or other external network the data corresponding to the fields that can be used to identify the thing in the IoT network separately from the rest of the data along with a mapping, which is used by the receiving party to reassemble the original record. By de-coupling the identifying information from the remainder of the information, it may be more difficult for a hostile party to collect data on a particular thing in an IoT network the hostile party wants to target.

FURTHER DEFINITIONS AND EMBODIMENTS

In the above-description of various embodiments of the present disclosure, aspects of the present disclosure may be illustrated and described herein in any of a number of patentable classes or contexts including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "circuit," "module," "component," or "system." Furthermore, aspects of the present disclosure may take the form of a computer program product comprising one or more computer readable media having computer readable program code embodied thereon.

Any combination of one or more computer readable media may be used. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods, and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Like reference numbers signify like elements throughout the description of the figures.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

What is claimed is:

1. A method comprising:
performing operations as follows on a processor of an edge device of a network:
receiving a data record from a thing, the record comprising a plurality of fields;
replacing information in one of the plurality of fields that provides an identity of the thing with mask information that masks the identity the thing;
communicating the data record with the mask information toward an information processor external to the network in a first message;
communicating the information in the one of the plurality of fields that identifies the thing toward the information processor external to the network in a second message that is communicated separately from the first message; and
communicating mapping information that associates the first message with the second message toward the information processor.

2. The method of claim 1, wherein the information in the one of the plurality of fields that identifies the thing identifies the thing as an electronic communication device.

3. The method of claim 1, wherein the information in the one of the plurality of fields that identifies the thing identifies the thing as an object of the information world.

4. The method of claim 1, wherein communicating the information in the one of the plurality of fields that identifies the thing toward the information processor comprises:
encrypting the information in the one of the plurality of fields that identifies the thing top generate encrypted information and
communicating the encrypted information in the one of the plurality of fields that identifies the thing toward the information processor external to the network in the second message.

5. The method of claim 4, wherein encrypting the information in the one of the plurality of fields that identifies the thing comprises:
encrypting the information in the one of the plurality of fields that identifies the thing using one of public key encryption, symmetric key encryption, a substitution cipher, a transposition cipher, and a block cipher.

6. The method of claim 5, wherein communicating the mapping information that associates the first message with the second message toward the information processor comprises:
encrypting the mapping information that associates the first message with the second message to generate encrypted mapping information; and
communicating the encrypted mapping information that associates the first message with the second message toward the information processor.

7. The method of claim 6, further comprising:
communicating a first key to decrypt the encrypted information in one of the first message and the second message; and
communicating a second key to decrypt the encrypted mapping information in one of the first message and the second message.

8. The method of claim 1, wherein the information in the one of the plurality of fields that identifies the thing comprises one of an Internet Protocol (IP) address, a Media Access Control (MAC) address, a manufacturer identification code, a non-manufacturer identification code, a name of the thing, and a description of the thing.

9. The method of claim 1, wherein the first message comprises a first label and the second message comprises a second label; and
wherein the mapping information comprises a data structure that associates the first label with the second label.

10. A system, comprising:
a processor of an edge device of a network; and
a memory coupled to the processor and comprising computer readable program code embodied in the memory that when executed by the processor causes the processor to perform operations comprising:
receiving a data record from a thing, the record comprising a plurality of fields;
replacing information in one of the plurality of fields that provides an identity of the thing with mask information that masks the identity the thing;
communicating the data record with the mask information toward an information processor external to the network in a first message;
communicating the information in the one of the plurality of fields that identifies the thing toward the information processor external to the network in a second message that is communicated separately from the first message; and
communicating mapping information that associates the first message with the second message toward the information processor.

11. The system of claim 10, wherein communicating the information in the one of the plurality of fields that identifies the thing toward the information processor comprises:
encrypting the information in the one of the plurality of fields that identifies the thing top generate encrypted information and
communicating the encrypted information in the one of the plurality of fields that identifies the thing toward the information processor external to the network in the second message.

12. The system of claim 11, wherein encrypting the information in the one of the plurality of fields that identifies the thing comprises:
encrypting the information in the one of the plurality of fields that identifies the thing using one of public key encryption, symmetric key encryption, a substitution cipher, a transposition cipher, and a block cipher.

13. The system of claim 12, wherein communicating the mapping information that associates the first message with the second message toward the information processor comprises:
encrypting the mapping information that associates the first message with the second message to generate encrypted mapping information; and
communicating the encrypted mapping information that associates the first message with the second message toward the information processor.

14. The system of claim 10, wherein the information in the one of the plurality of fields that identifies the thing comprises one of an Internet Protocol (IP) address, a Media Access Control (MAC) address, a manufacturer identification code, a non-manufacturer identification code, a name of the thing, and a description of the thing.

15. The system of claim 10, wherein the first message comprises a first label and the second message comprises a second label; and
wherein the mapping information comprises a data structure that associates the first label with the second label.

16. A computer program product, comprising:
a tangible computer readable storage medium comprising computer readable program code embodied in the medium that when executed by a processor of an edge device of a network causes the processor to perform operations comprising:
receiving a data record from a thing, the record comprising a plurality of fields;
replacing information in one of the plurality of fields that provides an identity of the thing with mask information that masks the identity the thing;
communicating the data record with the mask information toward an information processor external to the network in a first message;
communicating the information in the one of the plurality of fields that identifies the thing toward the information processor external to the network in a second message that is communicated separately from the first message; and
communicating mapping information that associates the first message with the second message toward the information processor.

17. The computer program product of claim 16, wherein communicating the information in the one of the plurality of fields that identifies the thing toward the information processor comprises:
- encrypting the information in the one of the plurality of fields that identifies the thing top generate encrypted information and
- communicating the encrypted information in the one of the plurality of fields that identifies the thing toward the information processor external to the network in the second message.

18. The computer program product of claim 17, wherein encrypting the information in the one of the plurality of fields that identifies the thing comprises:
- encrypting the information in the one of the plurality of fields that identifies the thing using one of public key encryption, symmetric key encryption, a substitution cipher, a transposition cipher, and a block cipher.

19. The computer program product of claim 18, wherein communicating the mapping information that associates the first message with the second message toward the information processor comprises:
- encrypting the mapping information that associates the first message with the second message to generate encrypted mapping information; and
- communicating the encrypted mapping information that associates the first message with the second message toward the information processor.

20. The computer program product of claim 16, wherein the first message comprises a first label and the second message comprises a second label; and
- wherein the mapping information comprises a data structure that associates the first label with the second label.

* * * * *